US008670395B2

(12) United States Patent
Singh et al.

(10) Patent No.: US 8,670,395 B2
(45) Date of Patent: Mar. 11, 2014

(54) SYSTEM AND METHOD FOR PRIORITY DRIVEN CONTENTION SCHEME FOR SUPPORTING ENHANCED QOS IN A WIRELESS COMMUNICATION NETWORK

(75) Inventors: Harkirat Singh, Santa Clara, CA (US); Chiu Ngo, San Francisco, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 669 days.

(21) Appl. No.: 12/455,438

(22) Filed: Jun. 1, 2009

(65) Prior Publication Data

US 2009/0323611 A1    Dec. 31, 2009

Related U.S. Application Data

(60) Provisional application No. 61/076,015, filed on Jun. 26, 2008.

(51) Int. Cl.
*H04W 72/04* (2009.01)

(52) U.S. Cl.
USPC ............ 370/329; 370/341; 370/348; 370/442

(58) Field of Classification Search
USPC .................. 370/329, 341, 348, 442, 235, 412
See application file for complete search history.

(56) References Cited

U.S. PATENT DOCUMENTS

| 5,615,212 | A  | * | 3/1997  | Ruszczyk et al. ............. 370/433 |
| 5,886,993 | A  | * | 3/1999  | Ruszczyk et al. ............. 370/451 |
| 6,198,728 | B1 | * | 3/2001  | Hulyalkar et al. ......... 370/310.1 |
| 6,795,421 | B1 |   | 9/2004  | Heinonen et al. |
| 6,807,158 | B2 |   | 10/2004 | Krishnamurthy et al. |
| 6,868,072 | B1 | * | 3/2005  | Lin et al. ........................ 370/276 |
| 6,925,064 | B2 |   | 8/2005  | Hester et al. |
| 7,079,812 | B2 |   | 7/2006  | Miller et al. |
| 7,088,702 | B2 |   | 8/2006  | Shvodian |
| 7,127,254 | B2 |   | 10/2006 | Shvodian et al. |
| 7,184,767 | B2 |   | 2/2007  | Gandolfo |
| 7,251,235 | B2 |   | 7/2007  | Wentink |
| 7,280,518 | B2 |   | 10/2007 | Montano et al. |
| 7,280,801 | B2 |   | 10/2007 | Dahl |
| 7,339,916 | B2 |   | 3/2008  | Kwon et al. |
| 7,356,341 | B2 |   | 4/2008  | Nanda |
| 7,359,398 | B2 |   | 4/2008  | Sugaya |
| 7,385,943 | B2 | * | 6/2008  | Niddam ........................ 370/321 |

(Continued)

OTHER PUBLICATIONS

Mirkovic, J. et al., "A MAC Protocol With Multi-User MIMO Support for Ad-Hoc WLANs", The 18th Annual IEEE International Symposium on Personal, Indoor and Mobile Radio Communications (PIMRC'07), IEEE, 2007, pp. 1-5, United States.

(Continued)

*Primary Examiner* — Rasheed Gidado
(74) *Attorney, Agent, or Firm* — Kenneth L. Sherman, Esq.; Michael Zarrabian, Esq.; Sherman & Zarrabian LLP (57) ABSTRACT

A system and method for priority driven contention in a wireless communication network is disclosed. In one particular embodiment, the system comprises an access point configured to transmit a beacon indicative of available channel resources and a partitioning of a contention period into a plurality of superslots, each superslot associated with a priority, and a station configured to contend for the channel by transmitting, during a superslot associated with the identified priority or a superslot associated with a priority lower than the identified priority, data indicative of an allocation of available channel resources.

34 Claims, 7 Drawing Sheets

(56) References Cited

U.S. PATENT DOCUMENTS

| | | | |
|---|---|---|---|
| 7,388,833 B2 | 6/2008 | Yuan et al. | |
| 7,400,899 B2 | 7/2008 | Shin et al. | |
| 7,447,174 B2 | 11/2008 | Joshi | |
| 7,447,180 B2* | 11/2008 | Jeong et al. | 370/335 |
| 7,474,686 B2 | 1/2009 | Ho | |
| 7,480,266 B2 | 1/2009 | Murty et al. | |
| 7,486,650 B2 | 2/2009 | Trainin | |
| 7,539,930 B2 | 5/2009 | Ginzburg et al. | |
| 7,545,771 B2 | 6/2009 | Wentink et al. | |
| 7,561,510 B2 | 7/2009 | Imamura et al. | |
| 7,570,656 B2* | 8/2009 | Raphaeli et al. | 370/445 |
| 7,590,078 B2 | 9/2009 | Nanda | |
| 7,623,542 B2* | 11/2009 | Yonge et al. | 370/445 |
| 7,634,275 B2 | 12/2009 | Odman | |
| 7,664,132 B2 | 2/2010 | Benveniste | |
| 7,680,150 B2 | 3/2010 | Liu et al. | |
| 7,787,487 B2 | 8/2010 | Liu | |
| 7,860,054 B2 | 12/2010 | Benveniste | |
| 7,924,805 B2 | 4/2011 | Nishibayashi et al. | |
| 8,072,961 B2 | 12/2011 | Takano | |
| 8,089,946 B2 | 1/2012 | Brommer | |
| 8,179,867 B2 | 5/2012 | Seok | |
| 8,532,221 B2 | 9/2013 | Liu et al. | |
| 2002/0057709 A1* | 5/2002 | Edmon et al. | 370/442 |
| 2003/0003905 A1 | 1/2003 | Shvodian | |
| 2003/0137970 A1 | 7/2003 | Odman | |
| 2003/0137993 A1 | 7/2003 | Odman | |
| 2003/0152059 A1 | 8/2003 | Odman | |
| 2003/0214928 A1* | 11/2003 | Chuah | 370/336 |
| 2003/0214967 A1 | 11/2003 | Heberling | |
| 2004/0047319 A1 | 3/2004 | Elg | |
| 2004/0053621 A1 | 3/2004 | Sugaya | |
| 2004/0199686 A1 | 10/2004 | Karaoguz | |
| 2004/0214571 A1 | 10/2004 | Hong | |
| 2004/0218683 A1 | 11/2004 | Batra et al. | |
| 2004/0264475 A1 | 12/2004 | Kowalski | |
| 2005/0058151 A1 | 3/2005 | Yeh | |
| 2005/0130634 A1 | 6/2005 | Godfrey | |
| 2005/0135318 A1 | 6/2005 | Walton et al. | |
| 2005/0232275 A1 | 10/2005 | Stephens | |
| 2006/0002428 A1 | 1/2006 | Trainin | |
| 2006/0050742 A1 | 3/2006 | Grandhi et al. | |
| 2006/0166683 A1 | 7/2006 | Sharma et al. | |
| 2006/0176908 A1 | 8/2006 | Kwon et al. | |
| 2006/0193279 A1 | 8/2006 | Gu et al. | |
| 2006/0268800 A1 | 11/2006 | Sugaya et al. | |
| 2006/0280200 A1* | 12/2006 | Lane et al. | 370/458 |
| 2006/0285516 A1 | 12/2006 | Li et al. | |
| 2007/0116035 A1 | 5/2007 | Shao et al. | |
| 2007/0280180 A1 | 12/2007 | Dalmases et al. | |
| 2008/0159208 A1* | 7/2008 | Kloker et al. | 370/329 |
| 2008/0279204 A1* | 11/2008 | Pratt et al. | 370/406 |
| 2008/0291873 A1 | 11/2008 | Benveniste | |
| 2009/0052389 A1 | 2/2009 | Qin et al. | |
| 2009/0086706 A1 | 4/2009 | Huang et al. | |
| 2009/0092086 A1* | 4/2009 | Lee et al. | 370/329 |
| 2009/0275292 A1 | 11/2009 | Chang | |
| 2009/0285163 A1* | 11/2009 | Zhang et al. | 370/329 |
| 2010/0002639 A1 | 1/2010 | Qin et al. | |
| 2010/0046453 A1 | 2/2010 | Jones, IV et al. | |
| 2010/0046518 A1 | 2/2010 | Takagi et al. | |
| 2010/0220601 A1 | 9/2010 | Vermani et al. | |
| 2010/0310003 A1 | 12/2010 | Lauer et al. | |
| 2011/0002319 A1 | 1/2011 | Husen et al. | |
| 2011/0064013 A1 | 3/2011 | Liu et al. | |
| 2011/0090855 A1 | 4/2011 | Kim | |
| 2011/0176627 A1 | 7/2011 | Wu et al. | |
| 2011/0235513 A1 | 9/2011 | Ali | |
| 2011/0255618 A1 | 10/2011 | Zhu et al. | |
| 2011/0317630 A1 | 12/2011 | Zhu et al. | |
| 2012/0008490 A1 | 1/2012 | Zhu | |
| 2012/0082200 A1 | 4/2012 | Verikoukis et al. | |
| 2012/0087358 A1 | 4/2012 | Zhu et al. | |
| 2012/0140615 A1 | 6/2012 | Gong | |
| 2012/0218947 A1 | 8/2012 | Merlin et al. | |
| 2012/0314694 A1 | 12/2012 | Hsieh | |

OTHER PUBLICATIONS

Stacey, R. et al., "DL MU-MIMO Ack Protocol (IEEE 802.11-09/1172r0)", IEEE, Nov. 16, 2009, pp. 1-8, United States.

IEEE Computer Society, "IEEE Std 802®-2001 (R2007), IEEE Standard for Local and Metropolitan Area Networks: Overview and Architecture", IEEE, Feb. 7, 2002, pp. i-36, New York, United States.

Camp, J.D. et al., "The IEEE 802.11s Extended Service Set Mesh Networking Standard", IEEE Communications Magazine, vol. 46, No. 8, IEEE, Aug. 2008, pp. 1-6, United States.

U.S. Final Office Action mailed May 12, 2010 for U.S. Appl. No. 11/589,519.

U.S. Notice of Allowance mailed Jan. 24, 2011 for U.S. Appl. No. 11/589,519.

Harada, Hiroshi, Unified and flexible millimeter wave WPAN systems supported by common mode. *IEEE* 802.15-07-0761-10-003c, Slides 1-62, Sep. 2007.

IEEE 802.16e™ -2005, Standard for Local and Metropolitan Area Networks—Part 16: Air Interface for Fixed and Mobile Broadband Wireless Access Systems; Amendment 2: Physical and Medium Access Control Layers for Combined Fixed and Mobile Operation in Licensed Bands and Corrigendum 1;—Feb. 28, 2006, pp. 1-864.

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999), IEEE Computer Society, 1232 pages, (Jun. 12, 2007).

IEEE P802.11e/D13.0, "Amendment: Medium Access Control (MAC) Quality of Service (QoS) Enhancements," Jan. 2005, pp. 1-198.

IEEE Wireless LAN Edition (2003), A compilation based on IEEE Std. 802.11TM-1999 (R 2003) and its Amendments.

International Search Report dated Jan. 9, 2009 for Application No. PCT/KR08/004793, filed Aug. 19, 2008.

Kim et al., QoS enhancement scheme of EDCF in IEEE 802.11e wireless LANs, Electronics Letters 40(17): 1091-1092, Aug. 19, 2004.

Mujtaba et al., TGn Sync Proposal Technical Specification, IEEE 802.11-04-08 89r7, Jul. 2005.

U.S. Office Action dated Aug. 21, 2007 in U.S. Appl. No. 11/044,600, filed Jan. 26, 2005.

U.S. Office Action dated Aug. 7, 2008 in U.S. Appl. No. 11/044,600, filed Jan. 26, 2005.

U.S. Office Action dated Jan. 15, 2008 in U.S. Appl. No. 11/044,600, filed Jan. 26, 2005.

U.S. Office Action dated Jan. 25, 2007 in U.S. Appl. No. 11/044,600, filed Jan. 26, 2005.

U.S. Office Action dated Jun. 27, 2006 in U.S. Appl. No. 11/044,600, filed Jan. 26, 2005.

U.S. Office Action dated Jun. 9, 2009 in U.S. Appl. No. 11/589,519, filed Oct. 30, 2006.

Morioka, Y. et al., "Multi-RTS Proposal", IEEE 802.11-10/1124r01, Sep. 12, 2010, Slides 1-14, IEEE, USA.

U.S. Final Office Action mailed Dec. 19, 2012 for U.S. Appl. No. 12/415,981.

U.S. Advisory Action mailed Mar. 8, 2013 for U.S. Appl. No. 12/415,981.

U.S. Non-Final Office Action mailed Jun. 6, 2012 for U.S. Appl. No. 12/415,981.

U.S. Non-Final Office Action mailed May 29, 2012 for U.S. Appl. No. 12/821,940.

U.S. Final Office Action for U.S. Appl. No. 12/821,940 mailed Aug. 21, 2012.

(56) References Cited

OTHER PUBLICATIONS

U.S. Non-Final Office Action mailed Aug. 8, 2013 for U.S. Appl. No. 12/415,981.
U.S. Restriction Requirement for U.S. Appl. No. 13/030,070 mailed Nov. 5, 2013.
U.S. Restriction Requirement for U.S. Appl. No. 13/253,926 mailed Oct. 10, 2013.
U.S. Final Office Action mailed Jan. 14, 2014 for U.S. Appl. No. 12/415,981.
U.S. Non-Final Office Action for U.S. Appl. No. 13/177,386 mailed Dec. 17, 2013.
U.S. Non-Final Office Action for U.S. Appl. No. 13/253,926 mailed Nov. 25, 2013.

\* cited by examiner

SYSTEM AND METHOD FOR PRIORITY DRIVEN CONTENTION SCHEME FOR SUPPORTING ENHANCED QOS IN A WIRELESS COMMUNICATION NETWORK

CROSS-REFERENCE TO RELATED APPLICATIONS

This application claims the benefit under 35 U.S.C. §119(e) of U.S. Provisional Application No. 61/076,015, filed on Jun. 26, 2008, the disclosure of which is incorporated herein by reference in its entirety.

BACKGROUND

1. Field

The present invention relates to wireless communications and more particularly relates to random access schemes in a wireless network.

2. Description of the Related Technology

A wireless network may be any type of computer network that is wireless, and the term is commonly associated with a telecommunications network whose interconnections between nodes is implemented without the use of wires, such as a computer network (a type of communications network). Wireless telecommunications networks are generally implemented with some type of remote information transmission system that uses electromagnetic waves, such as radio waves, for the carrier and this implementation usually takes place at the physical level or "layer" of the network.

SUMMARY OF CERTAIN INVENTIVE ASPECTS

The types of wireless network include wireless personal area networks (WPANs), wireless local area networks (WLANs), and wireless metropolitan area networks (WMANs). U.S. patent application Ser. No. 12/189,534, filed Aug. 11, 2008, and entitled "System and method for multiple contention access periods," which is hereby incorporated by reference in its entirety, describes the concept of multiple sub-contention access periods (sub-CAPs). In one embodiment described by the above-mentioned applications, the coordinator of the network partitions the CAP into a number of sub-CAPs, and in each sub-CAP, a set of devices sharing a common parameter contend. In this way, random access efficiency is improved. The concept of multiple sub-CAPs may be applied to a WPAN, WLAN, or WMAN.

As disclosed herein, aspects described include 1) multiple contention periods for multiple priority classes, 2) the possibility of a device wishing to transmit data having multiple priority flows contending during multiple contention periods, and 3) the possibility for a device wishing to transmit high priority data to contend during a contention period assigned for low priority data. With respect to the last item, a device wishing to transmit low priority data may, in some embodiments, still be given deference in its own contention period.

One aspect of the disclosure is a system for allocating channel resources in a wireless data communication network, the system comprising an access point configured to transmit a beacon indicative of available channel resources and a partitioning of a contention period into a plurality of superslots, each superslot associated with a priority, and a station configured to contend for the channel by transmitting, during a superslot associated with the identified priority or a superslot associated with a priority lower than the identified priority, data indicative of an allocation of available channel resources.

Another aspect of the disclosure is a method of allocating channel resources in a wireless data communication network, the method comprising receiving data indicative of available channel resources, receiving data indicative of a partitioning of a contention period into a plurality of superslots, each superslot associated with a priority, identifying a priority of a data flow, and transmitting, during a superslot associated with a priority that is the identified priority or a superslot associated with a priority lower than the identified priority, data indicative of an allocation of the available channel resources.

Another aspect of the disclosure is a system for allocating channel resources in a wireless data communication network, the system comprising a receiver configured to receive information indicative of available channel resources and to receive information indicative of a partitioning of a contention period into a plurality of superslots, each superslot associated with a priority, a packet classifier configured to identify a priority of a data flow, and a transmitter configured to transmit, during a superslot associated with the identified priority or a superslot associated with a priority lower than the identified priority, data indicative of an allocation of available channel resources.

Yet another aspect of the disclosure is a method of allocating channel resources in a wireless data communication network, the method comprising transmitting information indicative of available channel resources, transmitting information indicative of a partitioning of a contention period into a plurality of superslots, each superslot associated with a priority, and receiving, during a superslot associated with the identified priority or a superslot associated with a priority lower than the identified priority, data indicative of an allocation of available channel resources.

DETAILED DESCRIPTION OF THE PREFERRED EMBODIMENT

Figure 1:
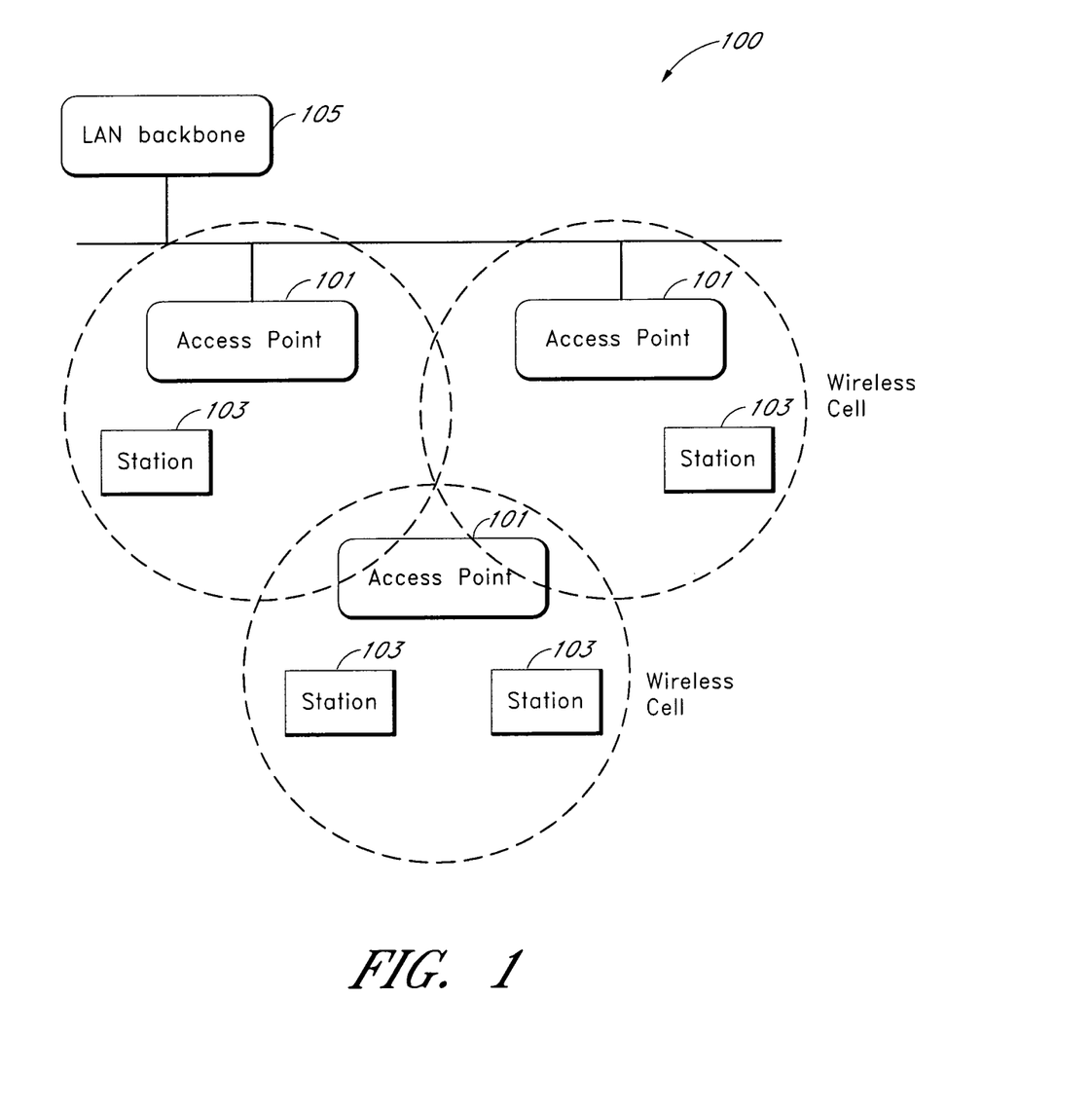
FIG. 1 is a block diagram illustrating an example wireless local area network (WLAN) configuration using an access point.

Exemplary implementations of an embodiment in a wireless network will now be described. The embodiment will be described in the context of a wireless local area network (WLAN). A skilled technologist will, however, appreciate that the embodiment can be adapted for other types of wireless networks. FIG. 1 is a block diagram illustrating an example wireless local area network (WLAN) configuration 100 using an access point 101. The example WLAN configuration 100 includes one or more access points 101 and one or more stations 103. In the example WLAN, the stations 103 include wireless clients. The access point 101 is a device that connects a wireless station 103 to the WLAN. In an access point based topology, the access points 101 are connected to a wired (e.g., Ethernet or token ring) or wireless backbone 105 and routes the traffic through the wired or wireless backbone. In a WLAN, the access point 101 enables a wireless station 103 to communicate with other wired or wireless stations on the WLAN 100. In some embodiments, the access point 101 supports the IEEE 802.11 Protocol.

The access point 101 is responsible for coordinating data transfer between itself and other devices and between two devices by partitioning the wireless channel time into a number of time periods and scheduling communication between specific devices during those time periods. The wireless station 103 can be a source of compressed or uncompressed video or audio. Examples of the wireless station 103 include a desktop computer, a laptop computer, a set-top box, a DVD player or recorder, a VCR (video cassette recorder, an audio player, a digital camera, a camcorder, and so forth. In some embodiments, the content can be protected content. The wireless station 103 can also be a sink of such data, including a television, a laptop computer, or a media player.

Figure 2:
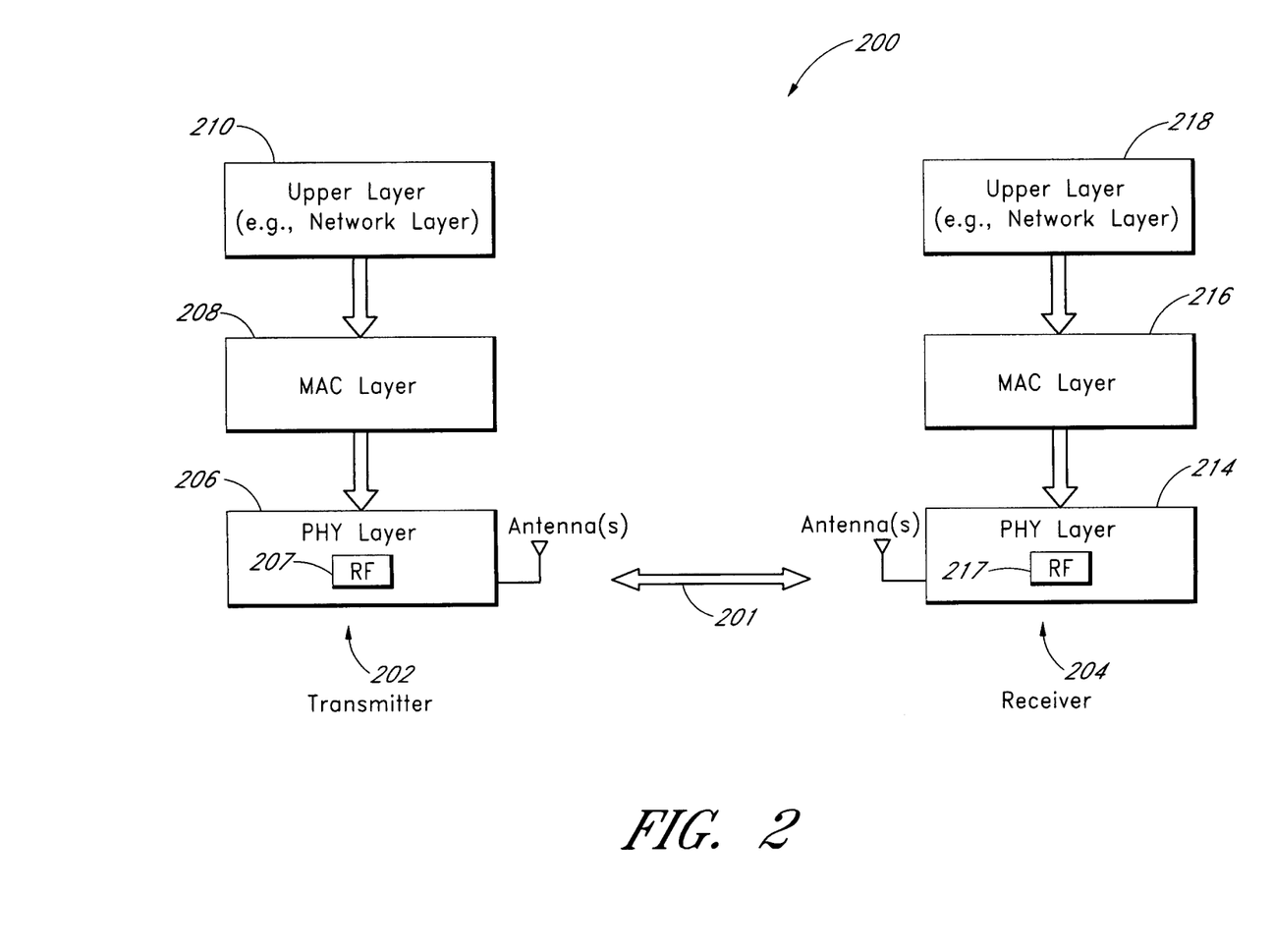
FIG. 2 is a functional block diagram of an example wireless local area network (WLAN) system, according to one embodiment of the system and method.

FIG. 2 shows a generalized block diagram illustrating an example wireless local area network (WLAN) system 200. The example WLAN system 200 includes a wireless transmitter 202 and wireless receiver 204. In certain embodiments, the WLAN system 200 shown in FIG. 2 represents an IEEE 802.11 stack. The transmitter 202 includes a physical (PHY) layer 206, a media access control (MAC) layer 208, an upper layer 210, and one or more antennas. Similarly, the receiver 204 includes a PHY layer 214, a MAC layer 216, an upper layer 218, and one or more antennas. In some embodiments, the PHY layers 206, 214 include radio frequency (RF) modules 207, 217. The PHY layers 206, 214 provide wireless communication between the transmitter 202 and the receiver 204 via the RF modules 207, 217 and the one or more antennas through a wireless medium 201. The MAC layers 208, 216 provides addressing and channel access controls that make it possible for several network nodes to communicate within a multipoint network such as the WLAN 100 shown in FIG. 1.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of routing data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer.

In the wireless transmitter 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the wireless receiver 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

A wireless network may support the communication of various types of data, including voice data, text messages, multimedia messages, streaming video, and application data. In some embodiments, different data types are treated differently by the network due to the quality of service requirements established for each data type. For example, voice data associated with a call need not be entirely accurate, because i) the human auditory system is well-adapted to comprehend a human voice even in imperfect conditions and ii) asking someone to repeat what they just said if the voice data is corrupted is considered a minor inconvenience. In contrast, it is generally preferable that the delay of voice data associated with a call be minimized, as conversation between two people is generally an interactive process. On the other hand, the communication of a text message may be delayed with minor consequence, as long as the message as transmitted accurately.

Figure 3:
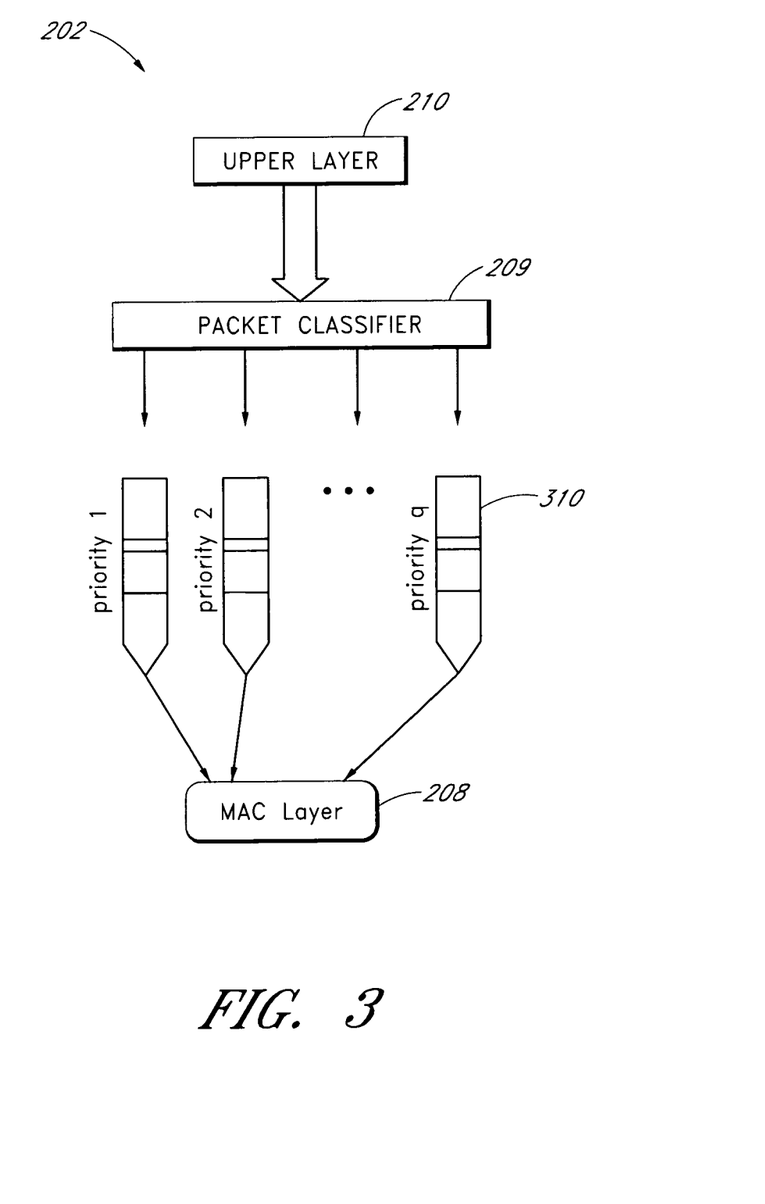
FIG. 3 is a functional block diagram of a transmitter including a packet classifier.

In order to provide different qualities of service (QoS) for different data types, the data packets for communication by a device are classified into a traffic type, wherein each traffic type is associated with a priority. FIG. 3 is a functional block diagram of a transmitter 202 including a packet classifier 209. As described above with respect to FIG. 2, the transmitter 202 includes an upper layer 210 and a MAC layer 208. The upper layer 210 includes an application layer from which data is communicated to the MAC layer 208 for eventual transmission by the PHY layer 206. In the illustrated embodiment, the application layer traffic is fed into a packet classifier 209 which classifies each packet according to a traffic type. Based on the classification, the packet classifier 209 places the packet into a priority queue 310 from which the data is read by the MAC layer 208. In FIG. 3, there are q priority queues 310 available in the network. In some embodiments, the number of priority queues may be different than the number of traffic types, for example, if more than one traffic type is given the same priority.

In one embodiment, there are four priority flows. The four priority flows can correspond to voice data, video data, background data, and best effort data. In one embodiment, the priorities are ordered such that voice data has the highest priority, video data has the second highest priority, background data has the third highest priority, and best effort data is assigned the lowest priority.

Figure 4:
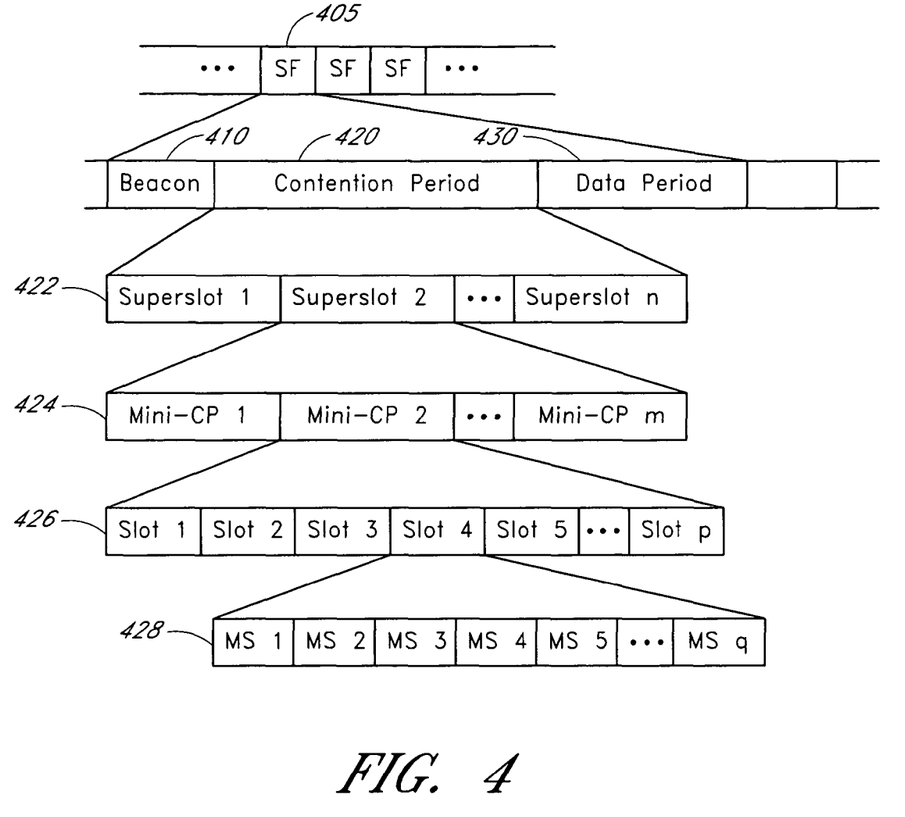
FIG. 4 is a timeline showing a plurality of superframes (SF) and their constituent parts, according to one embodiment.

As mentioned above with respect to FIG. 1, the access point 101 is configured to coordinate data transfer between itself and other devices and between two devices by partitioning the wireless channel time into a number of time periods and scheduling communication between specific devices during those time periods. FIG. 4 is a timeline 400 showing a plurality of superframes (SF) 405 and their constituent parts, according to one embodiment.

Each of the superframes 405 may be further partitioned into a beacon period 410, a contention period 420, and a data period 430. A skilled technologist will appreciate that the superframe may include other suitable periods, such as guard time periods, depending on the design of the network.

During the beacon period 410, the access point, such as the access point 101 of FIG. 1, transmits beacons to wireless devices. A beacon is an electromagnetic waveform from which the devices can retrieve information about the network. The beacon may, for example, contain information about the access point or the superframe partitioning, including the start and stop time of superframe partitions. A beacon may also contain data indicative previously allocated channel resources, e.g., when a particular device should transmit data to the access point (or another device) or vice versa. Beacons may be transmitted omni-directionally or in one or more particular directions. Beacons may be transmitted using any of a number of modulation and coding schemes, and any number of physical layer transmission schemes, including orthogonal frequency division multiplexing (OFDM) and single-carrier transmission. Beacons may be broadcast, such that any device may receive and interpret the beacon, or they may be addressed to a particular device or group of devices. Beacons transmitted within the beacon period 410 are not necessarily the same size, and thus do not necessarily take the same amount of time to transmit. The beacon period 410 may be partitioned into sub-beacon periods, where a beacon is transmitted in one direction by the coordinator during each sub-beacon period.

The wireless channel can be a random access channel during the contention period 420. Any of a number of random access schemes may be used in the network, including, but not limited to, slotted Aloha, carrier sense multiple access (CSMA), carrier sense multiple access with collision avoidance (CSMA/CA), or preamble sense multiple access (PSMA). As is the case in many random access schemes, collisions may occur when a number of devices transmit data packets simultaneously.

During the contention period 420, the wireless devices allocate channel resources by transmitting control packets. [0032] [0033] [0034] In some embodiments, an RAV (resource allocation vector) is transmitted to the access point to inform the access point that channel time is reserved. Such communication may be particularly useful when channel time is reserved between two devices, neither of them the access point.

Although channel allocation messages are typically transmitted during the contention period 420 of a superframe 400, other messages, including MAC commands, may be included in a packet and transmitted during this time. For example, devices may transmit data to one another, thereby bypassing the access point during the contention period 420. Also, other control packets besides RAVs may be transmitted from the devices to the access point during the contention period 420.

As mentioned above, the data period 430 is the time partition reserved for communication between specific devices of the network. During reserved channel time, two devices may efficiently transmit large amounts of data, such as audio or video data. Other non-data functions may also be performed during the reserved time, such as beamforming training or tracking procedures.

As illustrated in FIG. 4, and as described in U.S. patent application Ser. No. 12/189,534, filed Aug. 11, 2008, and entitled "System and method for multiple contention access periods," incorporated by reference above, the contention period 420 can be partitioned into a number of sub-periods. In one embodiment, the contention period 420 is partitioned into one or more superslots 422. Each superslot 422 is associated with a different priority, as defined by the packet classifier 209 of FIG. 3. In one embodiment, the superslots 422 are chronologically arranged such that a superslot associated with a higher priority occurs in time before a superslot associated with a lower priority.

In one embodiment, there are four priorities defined for the network. The access point 101 can thus define four superslots 422 during the contention period 420, each superslot 422 associated with a single priority. In one embodiment, a station 103 can indicate the traffic types it intends to produce when it associates with the access point. If the access point 101 is connected to a number of stations 103 that produce only traffic of type 1 (associated with priority of 1) and type 4 (associated with a priority of 4), the access point 101 can define only two superslots 422, each associated with the priority the access point 101 can expect to receive from its associated devices.

Each superslot 422 can be further partitioned into mini-contention periods 424. In one embodiment, each mini-contention period 424 is of a duration long enough to allow a successful round of contention for a data flow. For example, if an access point 101 is connected to a k stations intending to produce a data flow having priority p, the superslot 422 associated with priority p can be partitioned into k mini-contention periods 424. Thus, under appropriate circumstances, each station can reserve the channel for the data flow having priority p. For instance, priority p equals to 2 out of a total 4 possible priorities in one reference implementation.

Each mini-contention period 424 can be further partitioned into a number of slots 426. In one embodiment, each slot 426 is of a duration long enough to accommodate a single control packet, such as a RTS (Request to Send) or CTS (Clear to Send) packet. In another embodiment, each slot 426 is not of a duration long enough to accommodate a single control packet, but rather a control packet would occupy multiple slots 426. In one embodiment, only a subset of the slots 426 are used for contention, with the remainder of the slots 426 acting as a sort of guard period, to ensure that control packets which begin transmission during a slot 426 associated with a first mini-contention period 424 do not continue transmission during a second mini-contention period 424. The subset of slots 426 used for contention are continuous and called the contention window. The mini-contention period 424 can be partitioned into a contention window of one or more slots 424 and a non-contention window of one or more slots 424.

Each slot 426 can be further partitioned into a number of mini-slots 428. In one embodiment, each mini-slot 426 is approximately the duration of the receive-to-transmit gap as in IEEE 802.11 such that a CCA can be performed to sense the channel if idle and then to switch to the transmit mode.

Figure 5:
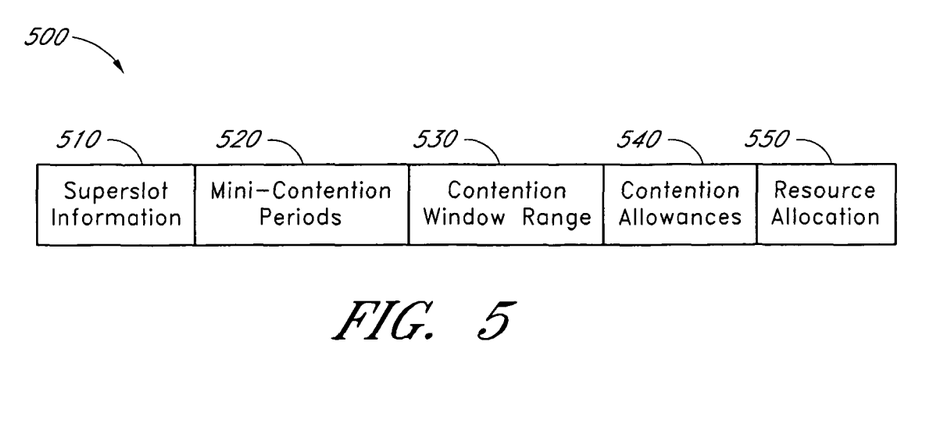
FIG. 5 is a timeline showing a beacon and its constituent parts according to one embodiment.

As described above, during the beacon period 410, the access point, such as the access point 101 of FIG. 1, transmits beacons to wireless devices. The beacon can contain information about the access point, the superframe partitioning, including the start and stop times of various superframe partitions, or channel allocation. FIG. 5 is a timeline showing a beacon 500 and its constituent parts according to one embodiment. The beacon 500 includes information about the superslots 510, the mini-contention periods 520, the contention window range 530, contention allowances 540, and resource allocation 550. The beacon 500 can include additional or less information than shown in FIG. 5.

The beacon 500 includes information about the superslot partitioning 510, which can include the number of superslots, their respective duration, the start or stop times for each superslot, the priority associated with each superslot, or other information. The superslot information 510 can also include the number of mini-contention periods associated with superslot, the number of slots associated with each superslot, or mini-slots associated with each superslot. This information can alternatively be included in the mini-contention period information 520. The contention window information 530 can include information regarding the number of slots in each mini-slot, which slots form the contention window, or other information. For example, the contention window information 530 can indicate a range of slots over which a slot can later be selected. As mentioned below, the selection process could be uniform random or non-uniform. In one embodiment the contention window information 530 is represented as [CWmin, CWmax], where CWmin is a minimum range of minislots and CWmax is a maximum range of slots. The contention allowances information 540 can indicate during which superslots a data flow having a specific priority is allowed to contend. For example, the contention allowances information 540 can indicate that during a third superslot, only data flows having a priority 3 can contend. In another embodiment, the contention allowances information 540 can indicate that during the third superslot, only data flows having a priority of 3 or higher can contend. In another embodiment, the contention allowances information 540 can indicate that all data flows can contend during a particular superslot or that certain data flows associated with a subset of the priorities can contend.

The beacon can also include data regarding resource allocation 550. In one embodiment, the resources are represented by a two-dimensional resource map in which a first dimension represents channel time and a second dimension represents frequency or sub-carrier, such as OFDM sub-carriers. The resource map can be stored as a matrix, in which the elements indicate whether or not a particular time unit-subcarrier has been allocated or reserved.

Figure 6:
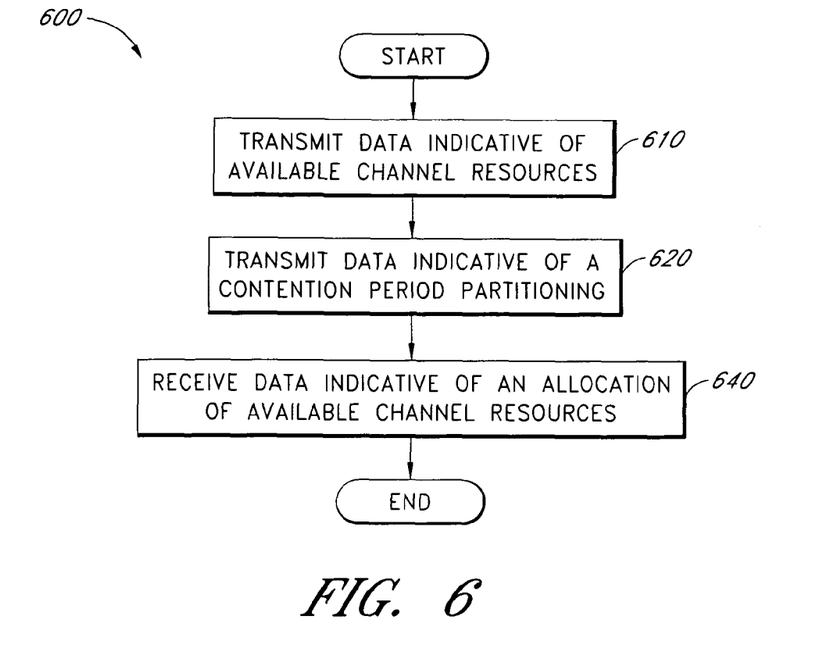
FIG. 6 is a flowchart illustrating a method of communicating channel resources and contention period partitioning in a wireless data communication network, according to one embodiment.

FIG. 6 is a flowchart illustrating a method of allocating channel resources in a wireless data communication network, according to one embodiment. The method 600 can be performed by the access point 101 of FIG. 1. Alternatively, the method 600 can be performed by a station 103, as shown in FIG. 1.

The method 600 begins, in block 610, with the transmission of data indicative of available channel resources. The transmission can be accomplished by transmitting a beacon during the beacon period of a superframe. As described above with respect to FIG. 5, this can include the transmission of a two-dimensional time-frequency resource map 550. In another embodiment, the access point 101 can preselect available channel resources for allocation, and transmit data indicative of the preselected resources.

The method 600 continues to block 620 with the transmission of data indicative of a contention period partitioning. The transmission, as above, can be accomplished by transmitting a beacon during the beacon period of a superframe. In one embodiment, the contention period partitioning indicates the partitioning of a contention period into a number of superslots, each associated with a priority. As described above with respect to FIG. 5, the contention period partitioning can include transmission of the number of superslots, their respective duration, the start or stop times for each superslot, the priority associated with each superslot, the number of mini-contention periods associated with superslot, the number of slots associated with each superslot, the number of mini-slots associated with each superslot, the number of slots in each mini-slot, which slots form the contention window, or contention allowances.

Although blocks 610 and 620 are shown in FIG. 6 and described consecutively, the order may be reversed. The transmission in block 620 can be performed before the transmission in block 610. Alternatively, the transmission in block 610 and block 620 can be performed simultaneously or intermittently. For example, a beacon can be transmitted containing superslot information, followed by a resource map, followed by contention allowances.

The method 600 moves to block 640 in which data is received indicative of an allocation of available channel resources. In one embodiment, a RAV (Resource Allocation Vector) is received, indicating which portions of the resource map are to be allocated to the transmitter of the RAV. In another embodiment, the data is indicative of a selection from a plurality of preselected channel resources. The allocation of available channel resources can be received during a superslot or a mini-contention period associated with a particular priority and can indicate that the allocation is for a data flow having the particular priority or a higher priority. For the case of station to station channel contention, the RAV frame is transmitted to a group address such that both the peer station 103 and the access point 101 receive and process the RAV frame. The method 600 can include additional blocks not shown in FIG. 6, including the transmission or reception of content data, such as control messages involved in contenting the shared channel. These control messages can include modified RTS and CTS messages in IEEE 802.11. In one embodiment, after receiving the RAV frame, the peer station 103 responds by transmitting an RRAV (Reply RAV). An RRAV frame carries the same information as a RAV frame does.

Figure 7:
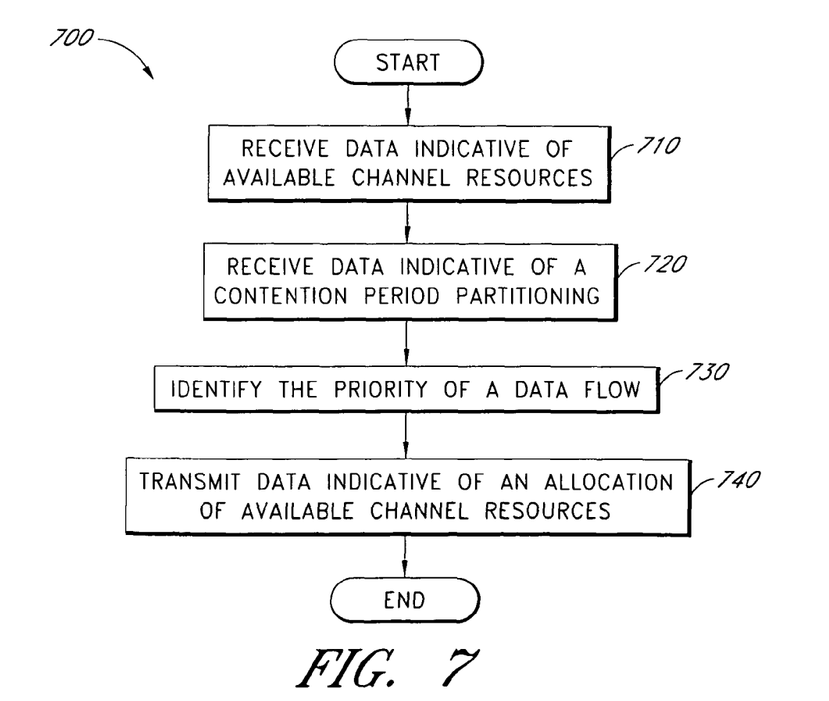
FIG. 7 is a flowchart illustrating a method of allocating channel resources in a wireless data communication network, according to another embodiment.

FIG. 7 is a flowchart illustrating a method of allocating channel resources in a wireless data communication network, according to another embodiment. In one embodiment, the method is performed during a contention access period. The method 700 can be performed by a station 103 of FIG. 1. Alternatively, the method 600 can be performed by an access point 101, as shown in FIG. 1.

The method 700 begins, in block 710, with the reception of data indicative of available channel resources. The reception can be accomplished by receiving a beacon during the beacon period of a superframe. As described above with respect to FIG. 5, this can include the reception [should it be reception?] of a two-dimensional time-frequency resource map. In another embodiment, the beacon may indicate preselected channel resources for allocation.

The method 700 continues to block 720 with the reception of data indicative of a contention period partitioning. The transmission, as above, can be accomplished by receiving a beacon during the beacon period of a superframe. In one embodiment, the contention period partitioning indicates the partitioning of a contention period into a number of superslots, each associated with a priority. As described above with respect to FIG. 5, the contention period partitioning can include transmission of the number of superslots, their respective duration, the start or stop times for each superslot, the priority associated with each superslot, the number of mini-contention periods associated with superslot, the number of slots associated with each superslot, the number of mini-slots associated with each superslot, the number of slots in each mini-slot, which slots or mini-slots form the contention window, or contention allowances.

Although blocks 710 and 720 are shown in FIG. 7 and described consecutively, the order may be reversed. The reception in block 720 can be performed before the reception in block 710. Alternatively, the reception in block 710 and block 720 can be performed simultaneously or intermittently. For example, a beacon can be received containing superslot information, followed by a resource map, followed by contention allowances.

The method 700 continues to block 730 in which the priority of a data flow is identified. The traffic type of a data flow can be indicated by the program producing the data, or by analysis of the data itself. The packet classifier 209 illustrated in FIG. 3 can classify each packet according to the identified data flow, or the data flow can be determined based on the classification performed by the packet classifier 209.

In block 740, data is transmitted indicative of an allocation of available channel resources. In another embodiment, the data is indicative of a selection from a plurality of preselected channel resources. The allocation of available channel resources can be transmitted during a superslot associated with a priority that is the identified priority or is lower than the identified priority. The method 700 can include additional blocks not shown in FIG. 6, including the transmission or reception of content data, such as audio or video data or including the reception of an RRAV.

Figure 8A:
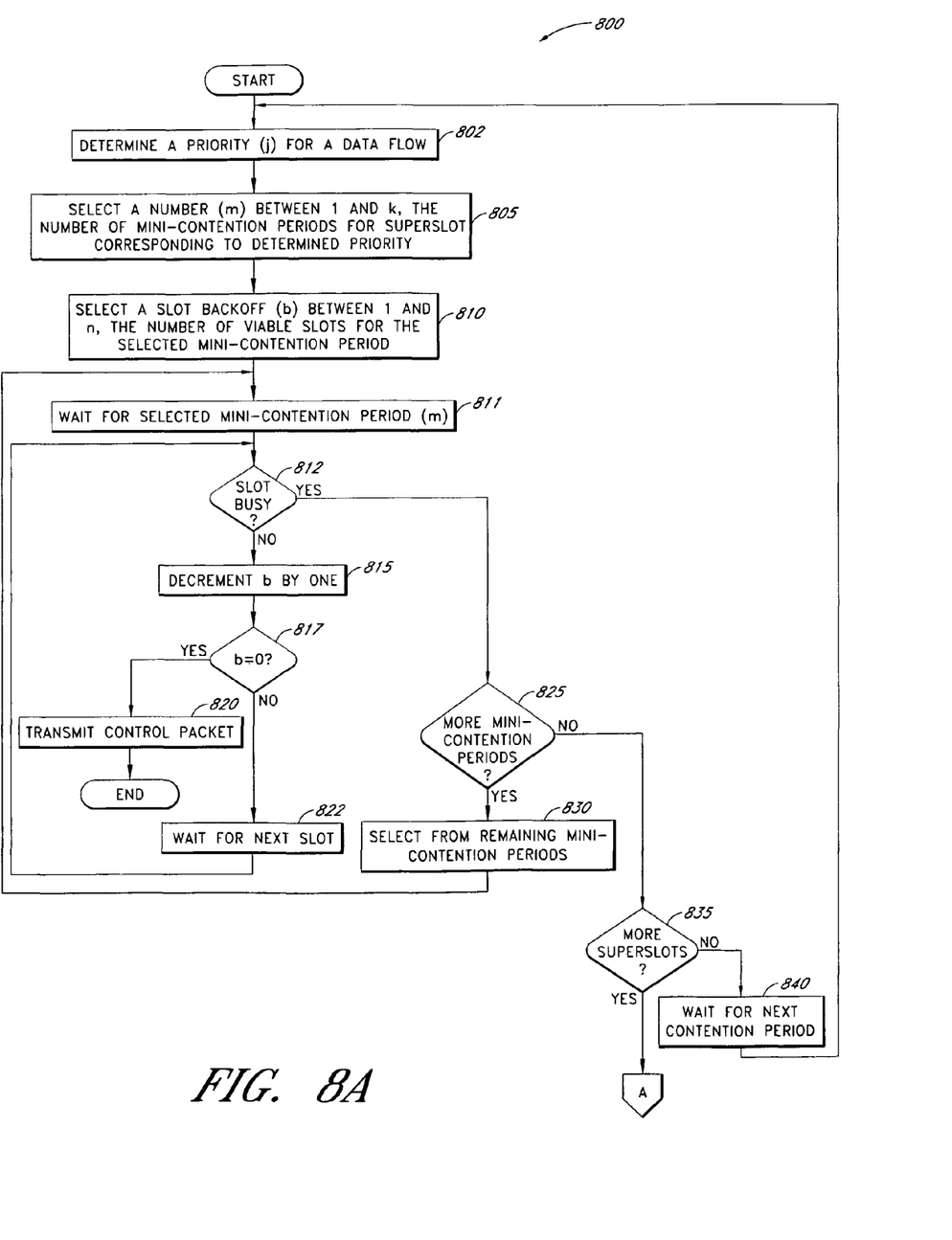
FIG. 8 is a flowchart illustrating another embodiment of a method of allocating channel resources in a wireless data communication network.
Figure 8B:
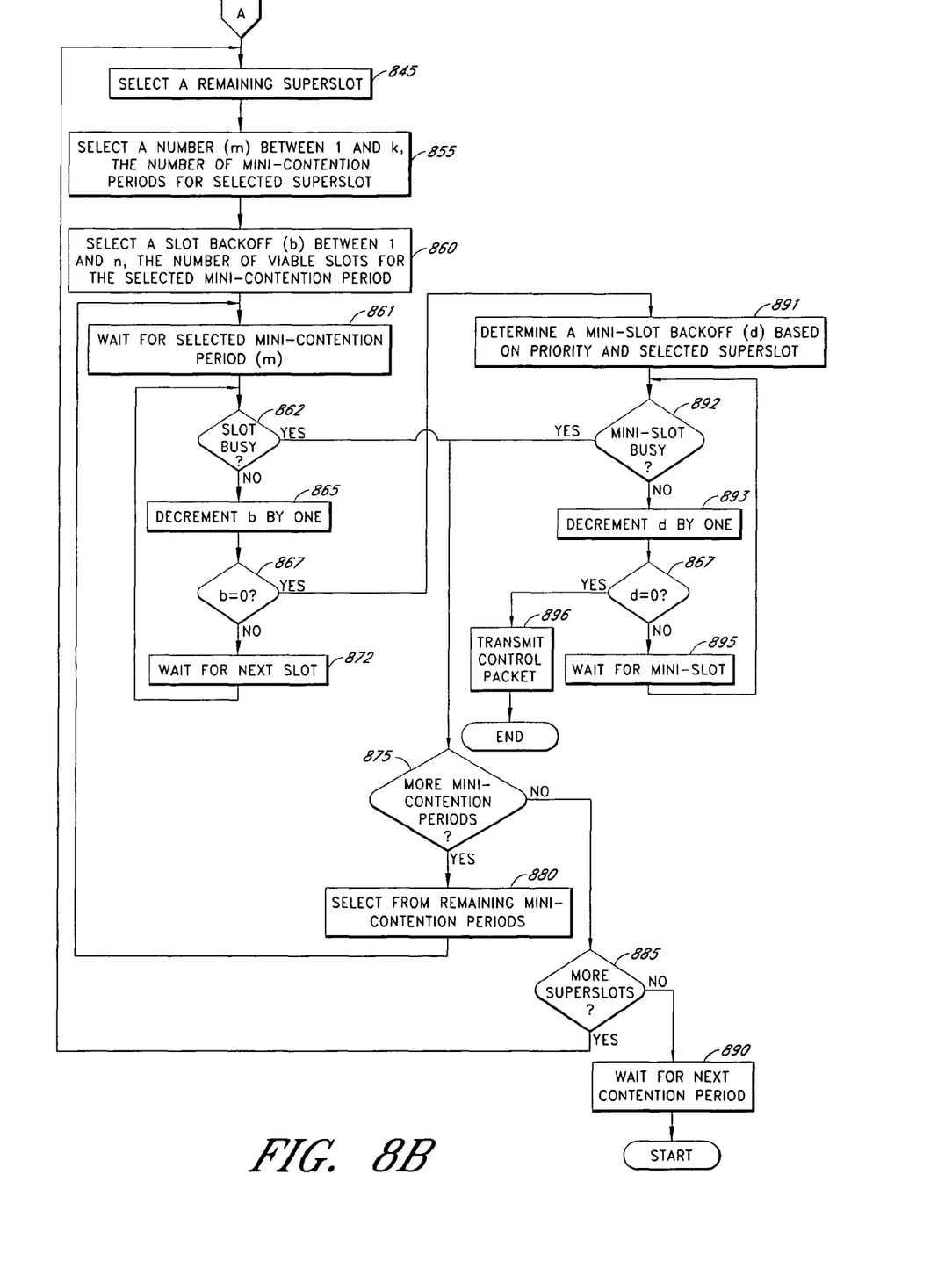

In general, a first device, such as station 103 in FIG. 1, can have data it wishes to transmit to a second device, such as access point 101 or another station 103 in FIG. 1. As described with respect to FIG. 3, the first device classifies the data into various priority queues, thereby associating a priority with each data flow. In order to allocate channel resources for the transmission of the data flow from the first device to the second device, the first device transmits a control packet to the second device (and any other devices of the network) indicative of the allocation. As described above with respect to FIG. 4, the channel time, and in particular, the contention period, can be partitioned into a number of sub-contention periods designed superslots, mini-contention periods, slots, and minislots. As described with respect to FIG. 5, data indicative of this partitioning can be communicated to the first device by a beacon. FIG. 8 is a flowchart illustrating a method of allocating channel resources in a wireless data communication network using this partitioning scheme.

The process 800, which can be performed by the first device, such as a station 103 in FIG. 1 or transmitter 202 in FIG. 2, begins in block 802 with the determination of the priority (j) of a data flow. The data flow can be, for example, voice data, video data, background data, or best effort data. The priority can be determined by the packet classifier 209 of FIG. 3.

In block 805, the process 800 continues with the selection of a number (m) between 1 and k, the number of mini-contention periods for the superslot associated with the priority (j) of the data flow. As mentioned above, the number of mini-contention periods (k) and the superslot associated with the priority of the data flow can be communicated to the first device via a beacon. The selection of m can be performed by a random number generator within the first device. In particular, m can be an instance of a discrete uniform random variable between 1 and k. In other embodiments, the selection of m is not random, or is random with a non-uniform distribution. The selection of m is indicative of a selection of a mini-contention period within the superslot associated with the priority of the dataflow.

In block 810, the first device selects a slot backoff (b) between 1 and n, the number of viable slots for the selected mini-contention period. As above, the number of viable slots can be communicated to the first device via a beacon. As described above with respect to FIG. 5, the contention window information 530 can indicate a range of slots over which a slot is selected. In one embodiment, the contention window information 530 is represented as [CWmin, CWmax], where CWmin is a minimum range of minislots and CWmax is a maximum range of slots.

As described above with respect to FIG. 4, in some embodiments, only a subset of the slots in a mini-contention period are part of the contention window, with the remainder of the slots acting as a sort of guard period, to ensure that control packets which begin transmission during a slot associated with a first mini-contention period do not continue transmission during a second mini-contention period. As with the selection of m, the selection of b can be performed by a random number generator within the first device. In particular, b can be an instance of a discrete uniform random variable between 1 and n. In other embodiments, the selection of b is not random, or is random with a non-uniform distribution. The selection of b is indicative of a selection of a slot within the selected mini-contention period.

As mentioned above, the selection of m is indicative of a selection of a mini-contention period from the k mini-contention periods in the superslot associated with the priority of the data flow. In block 811, the first device waits for the selected mini-contention period to continue the process 800.

The process 800 continues in block 812, where it is determined if the slot, beginning with the first slot of the selected mini-contention period, is busy. If the slot is not busy, the process moves to block 815, where b is decremented by one. It is then determined, in block 817, if b is equal to zero. If b is equal to zero, a control packet is transmitted, in block 820, indicative of an allocation of channel resources. For example, if b is selected, in block 810, as 1, indicative of a selection of the first available slot, and it is determined, in block 812, that the slot is not busy, b is decremented by one in block 815, thereby becoming zero. It is then determined that b is zero in block 817 and the process 800 continues to block 820, where a control packet is transmitted.

If it is determined, in block 817, that b is not equal to zero, the process 800 moves to block 822, where it waits for the next slot before returning to block 812. In this way, the first device waits b slots in which no channel activity is detected during the selected mini-contention period before transmitting a control packet.

If channel activity is detected and it is determined, in block 812, that the slot is busy, the process 800 moves to block 825 where it is determined if there are additional mini-contention periods in the superslot associated with the determined priority. If there are additional mini-contention periods in the superslot, the process 800 moves to block 830 where a mini-contention period is selected from the remaining mini-contention periods. The process 800 then continues by returning to block 811 where it waits for the newly selected mini-contention period.

It should be noted that the process 800 returns to block 811, and not to block 810 where the slot backoff is selected. Thus, even though the process has selected a new mini-contention period, the backoff, b, is unchanged by the determination, in block 812, that the slot is busy. In this way, the first device "freezes" the remaining backoff, b, as selected in block 810 and possibly decremented in block 815. Therefore, if the first device waited a number of slots before it was detected that the slot was busy, the backoff would be decremented by this amount and the first device could potentially transmit sooner than if a backoff were reselected.

If it is determined, in block 825, that there are no other mini-contention periods in the superslot associated with the determined priority, the process 800 moves to block 835 where it is determined if there are additional superslots in the contention period. If there are no additional superslots, the process 800 continues to block 840 where it waits for the next contention period before restarting the process by returning to block 802. As the priority of the data flow is unchanged, in one embodiment, the process returns to block 805 bypassing a redundant determination of the priority of the data flow.

If it is determined, in block 835, that there are additional superslots in the contention period, the process 800 moves to block 845, where one of the additional superslots is selected. The process 800 continues to block 855, where, as described with respect to block 805, a mini-contention period is selected from those in the selected superslot, and then to block 860, where, as described with respect to block 810, a slot backoff is selected. The process waits, in block 861, for the selected mini-contention period.

Blocks 862, 865, 867, 872, 875, 880, 885, and 890 of the process 800 function, respectively, as blocks 812, 815, 817, 822, 825, 830, 835, and 840 described above. The key difference is that when it is determined, in block 817, that b is equal to zero, a control packet is transmitted. When it is determined, in block 867, that b is equal to zero, the process moves to block 891 where a mini-slot backoff (d) is selected based on the priority and the selected superslot.

In general, the mini-slot backoff (d) linearly increases with the decrease in priority order. As described above, if the priority associated with the selected superslot is the same as the priority of the data flow, there is no mini-slot backoff and a control packet is transmitted immediately. If the priority associated with the selected superslot is different than the priority of the data flow, a mini-slot backoff is selected. In one embodiment, the highest priority data flow is given a mini-slot backoff of one mini-slot, the second highest priority data flow is given a mini-slot backoff of two mini-slots, and so on.

The process continues to black 892 where it is determined if the mini-slot, beginning with the first mini-slot, is busy. If the mini-slot is busy, the process moves to block 875. If the mini-slot is not busy, the process moves to block 893, where d is decremented by one. If it is determined that d is equal to zero, in block 894, a control packet is transmitted. If it is determined that d is not equal to zero, in block 894, the process waits, in block 895, for the next mini-slot before returning to block 892.

In one embodiment, transmission of a control packet, as performed in block 820 or 896, includes transmitting a RTS (Request to Send) packet to a second device, receiving a CTS (Clear to Send) packet from the second device, transmitting an RAV (Resource Allocation Vector) packet to the second device, and receiving an RRAV (Reply Resource Allocation Vector) packet from the second device. The RTS and CTS packets can be used to estimate the quality of the subcarriers at both the first device and the second device. The RAV packet can include two-dimensional resource allocation based on the RTS/CTS control frame exchange. The first dimension can be frequency sub-carrier and the second dimension can be a time unit selected based on the queue size, throughput requirements, and available subcarriers.

Since high priority flows are able to reserve subcarriers ahead of low priority flows, high quality subcarriers (e.g., as measured by signal-to-noise ratio (SNR)), can be allocated to high priority traffic. This helps to improve overall system quality. Similarly, akin to the priority level, the duration of the reserved resources (e.g, sub-carriers and time units) can follow a decreasing order from the highest priority queue to the lowest priority queue. For example, a data flow associated with a priority b can only reserve resources for m superframes, whereas a data flow associated with a priority q can reserve them for n superframes, where q>b and n>m.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A system for allocating channel resources in a wireless data communication network, the system comprising:
    an access point transmits a beacon indicative of available channel resources and a partitioning of a single contention period into a plurality of superslots, each superslot associated with a different priority selected from a plurality of priorities, wherein each superslot of the plurality of superslots is chronologically arranged in the single contention period; and
    a station identifies priority of a data flow and contends for the channel by transmitting, during a superslot associated with the identified priority or a superslot associated with a priority lower than the identified priority, data indicative of an allocation of available channel resources indicating a number of superframes for which specific resources are allocated.

2. The system of claim 1, wherein a superslot associated with a higher priority occurs in time prior than a superslot associated with a lower priority.

3. The system of claim 1, wherein each superslot of the plurality of superslots is associated with a single priority.

4. The system of claim 3, wherein each superslot is partitioned into a plurality of mini-contention periods.

5. The system of claim 4, wherein each of the plurality of mini-contention periods is partitioned into a plurality of slots.

6. The system of claim 1, wherein the beacon comprises a multi-dimensional resource map including a first dimension comprising channel time, and a second dimension comprising frequency or subcarrier type.

7. A method of allocating channel resources in a wireless data communication network, the method comprising:
    receiving data indicative of available channel resources;
    receiving data indicative of a partitioning of a single contention period into a plurality of superslots, each superslot associated with a different priority selected from a plurality of priorities, wherein each superslot of the plurality of superslots is chronologically arranged in the single contention period;
    identifying a priority of a data flow; and
    transmitting, during a superslot associated with a priority that is the identified priority or a superslot associated with a priority lower than the identified priority, data indicative of an allocation of the available channel resources indicating a number of superframes for which specific resources are allocated.

8. The method of claim 7, further comprising transmitting a data packet via the allocated channel resources.

9. The method of claim 7, wherein the information indicative of available channel resources comprises information indicative of available area in a time-slot/sub-carrier space.

10. The method of claim 7, wherein transmitting comprising transmitting during a superslot associated with the identified priority.

11. The method of claim 10, further comprising:
    selecting a mini-contention period associated with the superslot;
    selecting a slot associated with the selected mini-contention period; and determining, for each slot associated with the selected mini-contention period prior to the selected slot, that the channel is not busy.

12. The method of claim 10, further comprising:
selecting a first mini-contention period associated with the superslot;
selecting a backoff number associated with the first mini-contention period;
determining, for a number of slots associated with the first mini-contention period prior to the selected slot, that the channel is not busy; reducing the backoff by the number;
determining, for a particular slot associated with the first mini-contention period prior to the selected slot, that the channel is busy; and
selecting a second mini-contention period associated with the superslot.

13. The method of claim 10, wherein transmitting data indicative of an allocation of the available channel resources is performed without selection of a mini-slot.

14. The method of claim 7, wherein transmitting comprising transmitting during a superslot associated with a priority lower than the identified priority.

15. The method of claim 14, further comprising, prior to transmitting, sensing that the channel is busy during a superslot associated with the identified priority.

16. The method of claim 14, further comprising:
selecting a mini-contention period associated with the superslot;
selecting a slot associated with the selected mini-contention period;
determining, for each slot associated with the selected mini-contention period prior to the selected slot, that the channel is not busy;
selecting a mini-slot associated with the selected slot; and
determining, for each mini-slot associated with the selected slot prior to the selected mini-slot, that the channel is not busy.

17. The method of claim 16, wherein the selection of a mini-slot is based on the identified priority of the data flow and the priority associated with the superslot.

18. The method of claim 17, wherein the selected mini-slot number linearly increases with a decrease in the identified priority of the data flow.

19. The method of claim 7, wherein the transmitted data indicative of an allocation of the available channel resources is based on the indentified priority of the data flow.

20. The method of claim 19, wherein the indicated number of superframes is linearly proportional to the data flow priority.

21. A system for allocating channel resources in a wireless data communication network, the system comprising:
a receiver receives information indicative of available channel resources and receives information indicative of a partitioning of a single contention period into a plurality of superslots, each superslot associated with a different priority selected from a plurality of priorities, wherein each superslot of the plurality of superslots is chronologically arranged in the single contention period; and
a transmitter that transmits, during a superslot associated with an identified priority of a data flow or a superslot associated with a priority lower than the identified priority, data indicative of an allocation of available channel resources indicating a number of superframes for which specific resources are allocated.

22. The system of claim 21, wherein the system is a consumer electronics (CE) component.

23. A method of allocating channel resources in a wireless data communication network, the method comprising:
transmitting information indicative of available channel resources;
transmitting information indicative of a partitioning of a single contention period into a plurality of superslots, each superslot associated with a different priority selected from a plurality of priorities, wherein each superslot of the plurality of superslots is chronologically arranged in the single contention period; and
receiving, during a superslot associated with the identified priority or a superslot associated with a priority lower than the identified priority, data indicative of an allocation of available channel resources indicating a number of superframes for which specific resources are allocated.

24. The method of claim 23, wherein the information indicative of a partitioning further includes information indicative of one or more contention allowances, each contention allowance defining a set of priorities allowed to contend in a particular superslot.

25. The method of claim 24, wherein the contention allowances allow, in a superslot with a particular priority, contention for data flows having the particular priority and contention for data flows having a higher priority.

26. The method of claim 24, wherein the contention allowances allow, in a superslot with a particular priority, contention for data flows having the particular priority and contention for a subset of data flows having a higher priority.

27. The method of claim 23, wherein the information indicative of available channel resources and the information indicative of a partitioning are transmitted via a beacon.

28. The method of claim 27, wherein the beacon further comprises information indicative of one or more mini-contentions for each superslot.

29. The method of claim 28, wherein the beacon further comprises information indicative of one or more slots for each mini-contention.

30. The method of claim 27, wherein the beacon further comprises information indicative of one or more contention allowances.

31. A transmitter for allocating channel resources in a wireless data communication network, the system comprising:
a transmitter device including a packet classifier that identifies a priority of a data flow;
wherein the transmitter transmits, during a superslot associated with the identified priority or a superslot associated with a priority lower than the identified priority, data indicative of an allocation of available channel resources indicating a number of superframes for which specific resources are allocated, wherein each superframe includes a single contention period comprising a plurality of superslots each associated with a different priority, wherein each superslot of the plurality of superslots is chronologically arranged in the single contention period.

32. The transmitter of claim 31, wherein the indicated number of superframes is linearly proportional to the data flow priority.

33. A system for allocating channel resources in a wireless data communication network, the system comprising:
a receiver receives information indicative of available channel resources and receives information indicative of a partitioning of a single contention period into a plurality of superslots, each superslot associated with a different priority selected from a plurality of priorities, wherein each superslot of the plurality of superslots is chronologically arranged in the single contention period;

wherein the receiver receives, during a superslot associated with an identified priority of a data flow or a superslot associated with a priority lower than the identified priority, data indicative of an allocation of available channel resources indicating a number of superframes for which specific resources are allocated.

34. The system of claim 33, wherein the indicated number of superframes is linearly proportional to the data flow priority.

* * * * *